United States Patent Office 2,840,132
Patented June 24, 1958

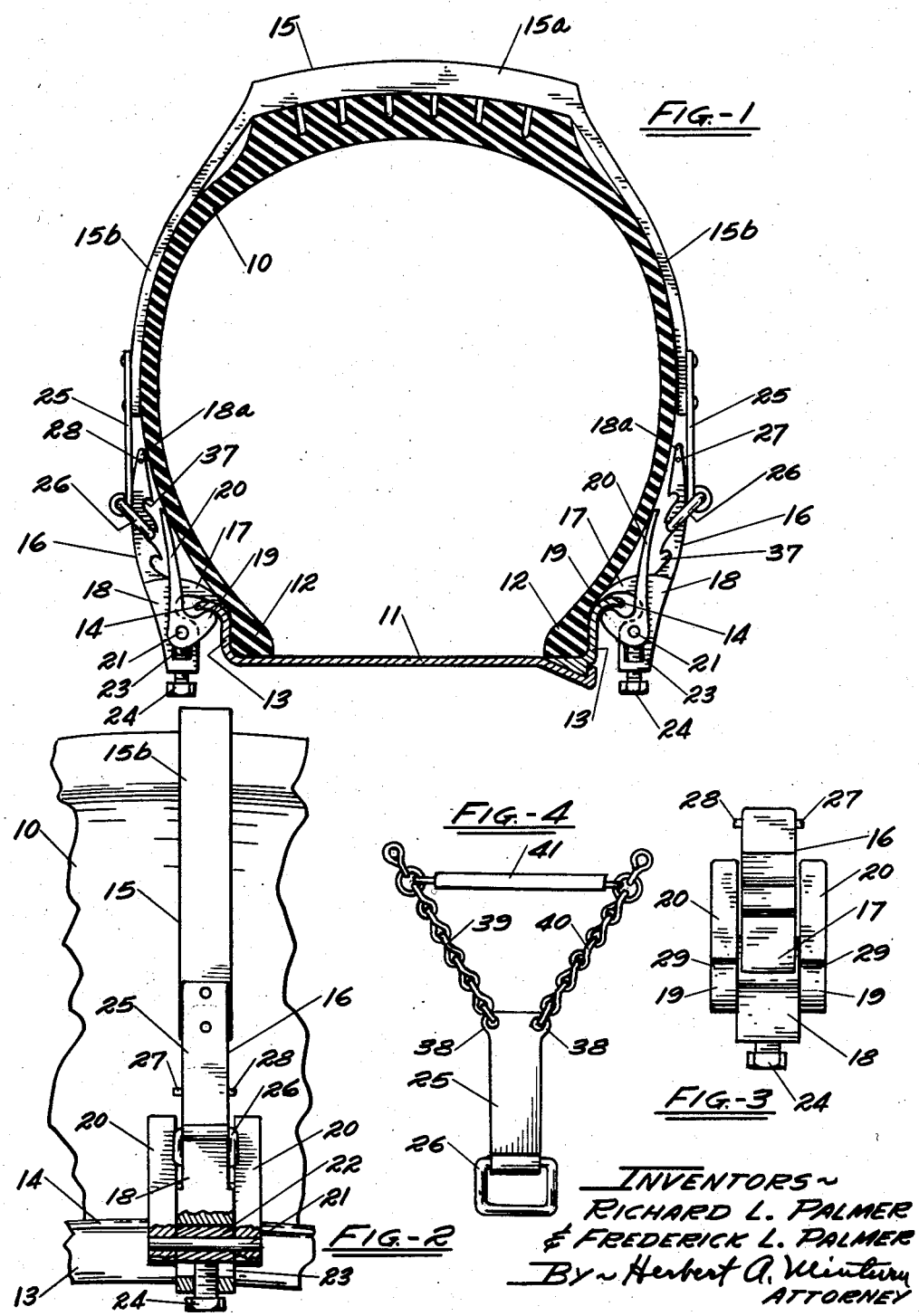

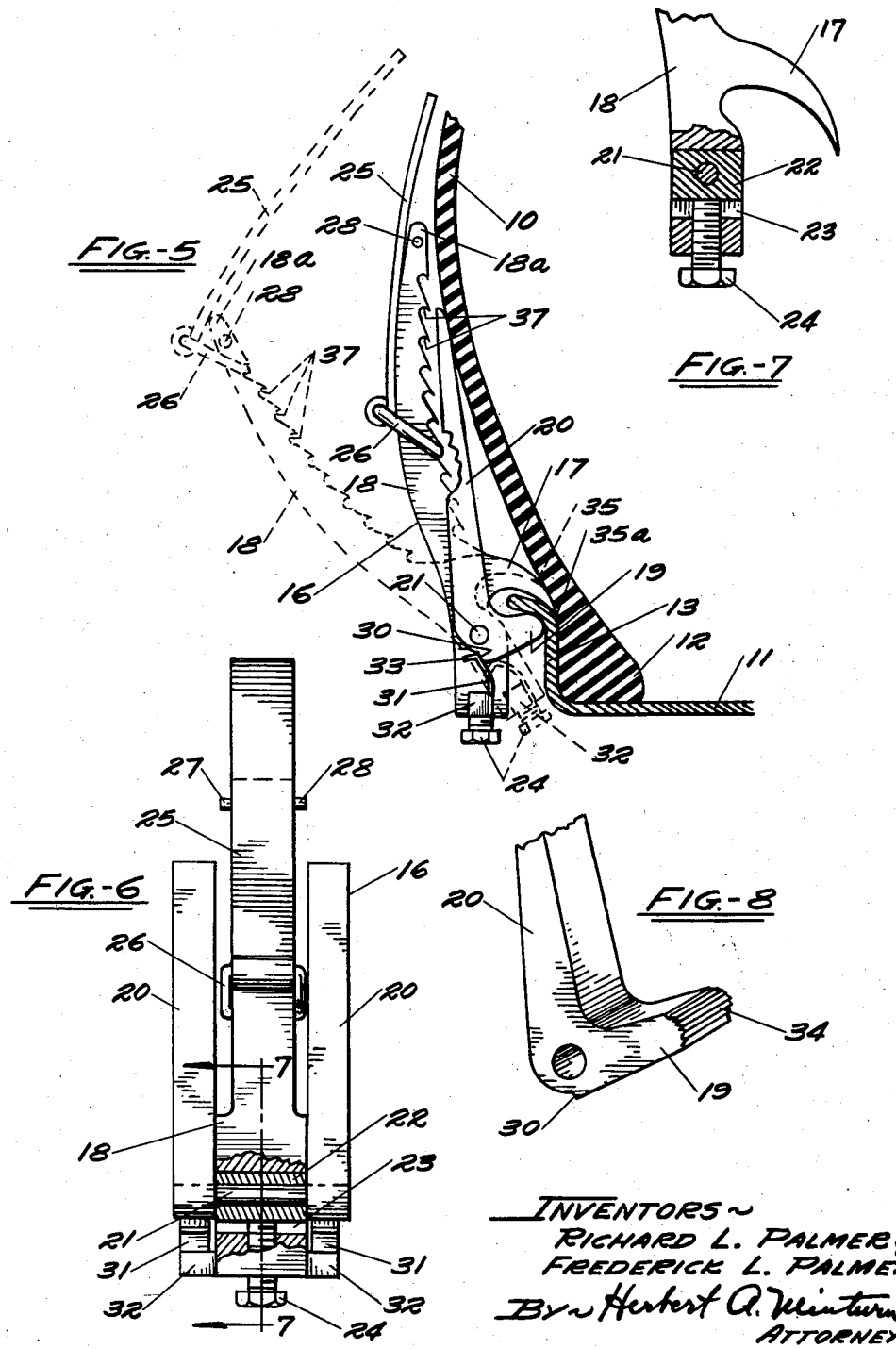

2,840,132

RIM CARRYING DETACHABLE TIRE LUG

Richard L. Palmer and Frederick L. Palmer, Indianapolis, Ind., assignors, by mesne assignments, of nine-tenths to said Richard L. Palmer and one-tenth to said Frederick L. Palmer Application March 8, 1957, Serial No. 644,945

10 Claims. (Cl. 152—225)

This invention relates to a lug for positioning over tires in trucks and automotive vehicles in general for the purpose of increasing traction particularly under such conditions where the wheels have become mired in mud and the like. The structure of the present invention is devised to engage the outturned lips of the tire rim flanges, on each side of the tire, being usable upon either dual tires or single tires as the case may be.

A primary object of the invention is to provide a structure which may be readily attached to and securely held by the outturned lips of the tire rims without having to pass through the wheel in any manner, and also such that the device may be applied to the tire when it is in the mired position, without having to attempt to jack up the truck or car.

In automobiles including trucks, it is quite a difficult job to reach around the tire when it is down in the mud and position any device for holding a lug, where the operator has to reach behind a tire and between the tire and the spring in order to position the attaching member on the rim.

The present invention is so constructed that it may be positioned by one hand of the operator and will remain attached to the rim on the inner side of the innermost tire while the lug is carried around over the top of the tire and then the lug secured to the outer side of the rim without the inner connecting device being displaced or falling off of the rim.

A further important object of the invention is to provide means incorporated in the over-all construction whereby the lug may be firmly seated around the tire so that there will be the minimum circumferential slip of the lug around the tire to the end that the lug will be quickly compressibly engaged by the tire upon an initial slight travel as will be occasioned when the lug strikes the mud as the wheel is being turned.

Further important objects of the invention reside in the unique combination of the various elements permitting an exceedingly simple structure which may be produced at a relatively low cost, with a minimum number of parts, and as set forth in the relationship indicated by the appended claims.

These and further objects and advantages of the invention will become apparent to those versed in the art by the following description of the invention as illustrated in the accompanying drawings, in which—

Fig. 1 is a view in transverse section through a tire and a rim to which the invention is applied;

Fig. 2 is a view in side elevation and partial section;

Fig. 3 is a view in inside elevation of the lug attaching device;

Fig. 4 is a detail in side elevation of a modified form of lug;

Fig. 5 is a detail in section and on an enlarged scale of a slightly modified form of the invention;

Fig. 6 is a view in outside elevation on a still further enlarged scale and in partial section of the attaching mechanism;

Fig. 7 is a view in vertical section on the line 7—7 in Fig. 6; and

Fig. 8 is a view in perspective on a still further enlarged scale of the lower end of the under engaging jaw of the attaching means.

Referring to that form of the invention as illustrated in Figs. 1–3, a tire 10 is shown as being mounted on a rim 11. The tire 10 may be either of the tube type or of the tubeless type as is herein indicated. The tire 10 will have its bead 12 firmly seated against the side flange 13 of the rim 11, from the outer portion of the flange 13 turns the outwardly flaring lip 14. It is to these lips 14, one on each side of the rim 11, that the present invention is to be attached. We provide for each lug generally indicated by the numeral 15 a pair of identical attaching means generally indicated by the numeral 16.

The means 16 consists of an upper lip engaging jaw 17 extending from a lug 18, and an under lip gripping jaw 19 constituting essentially a lower outturned leg of a lever 20. Substantially on central axes of the jaw 19 and the lever 20, that is at their intersections, there is a pin 21 passing through the lever 20 and on through the arm 18 to engage a like lever 20 on the opposite side of the member 18 also carrying an under lip engaging jaw 19. In practice, two levers 20 would normally be used as illustrated. For purpose of description one only is referred to.

As indicated in Figs. 2 and 7, the pin 21 rockably passes through a block 22 which is vertically slidable within a slot 23 provided in the lower end of the arm 18. The block 22 may be raised and lowered within the slot 23 by any suitable means, herein shown as by means of a capscrew 24 screw-threadedly passing through the lower end of the member 18 and bearing by its upper free end against the underside of the block 22. By this means, the jaw 19 may be raised and lowered in relation to the jaw 17.

The lug 15 in this particular form of the invention as illustrated in Figs. 1 and 2 may consist of a short circumferential length of a tire casing, such as may be cut from a used tire, this being flexible so that it may fit around the outside of the tire 10 and have the thickened portion 15a rest on the tread of the tire 10 with side, thinner lengths 15b extending, one on each side of the tire 10, toward the arms 18 respectively. These lengths 15b are interconnected with the two arms 18 in any suitable manner, preferably adjustably along those arms 18 so that there may be a take-up of the lug 15 around the tire. Not only is this advisable for the take-up, but it is also advisable to permit mounting of the entire device on the tire 10 and its rim 11.

In the form herein shown, there is a short metal strap 25 fixed to each of the ends of the portions 15b and extending therefrom to carry a ring 26, herein shown as being rectangular in shape. The ring 26 has a sufficient opening therethrough to permit the ring 26 to be loosely dropped downwardly over the outer free end 18a of the arm 18 in each instance, so that there will be one portion of the loop on the inside of the arm 18 toward the tire 10 and the other portion will be on the outside of the arm 18 and engaged to the strap 25, herein shown as by looping the strap around through the ring.

The inside of each arm 18 is serrated to provide a number of notches 37 into which the inner portion of the ring 26 may be dropped and the strap 25 pulled outwardly or upwardly along the outerside of the arm 18 to bring the strap into compressive contact with the arm 18 with the ring 26 being disposed diagonally upwardly and outwardly in relation to the view as shown in Fig. 1. The arm 18 is provided with laterally extending posts 27 and 28, one respectively on each side of the arm 18 as means for preventing the ring 26 from slipping entirely off the free end of the arm 18. As indicated in Fig. 3, the under jaw 19 in each instance has an upper and outwardly extending surface 29 which will be arcuate in conformity to the curvature of the underside of the lip 14 circumferentially of the rim 11 so that the surfaces 29 will fit snugly, and substantially over the entire contact area with the underside of the lip 14 all as will hereinafter be more fully described in the operation of the device.

Reference is made to Figs. 5–8 wherein the same structure as above described is illustrated plus one added feature which provides for retaining the jaws 17 and 19 in contact firmly with the upper and undersides of the lip 14 respectively. The retention means may assume different forms, even including the magnetizing of the jaw 19 to set up magnetic attraction between the jaw 19 and the rim 11, but the means herein shown consists of a mechanical device wherein the lowermost side of the jaw 19 immediately below the pivot pin 21 is cut away and rounded upwardly to form a shoulder 30. A spring 31 is mounted on each side of the lower end of the arm 18, herein shown as being secured to a lug 32 on each side, and extending by a free end portion 33 around upwardly and into the path of the shoulder 30.

The interrelationship of the spring 31 bearing against the underside of the jaw 19 and being carried by the arm 18 is such that when the spring end 33 drops behind the shoulder 30 as indicated in Fig. 5, the jaw 17 will be yieldingly maintained in the position indicated in Fig. 5 in relation to the jaw 19. The jaw 19, Fig. 8, may be serrated across its nose which comes into contact with the rim flange 13 and lip 14 to provide a series of teeth 34 therearound as means for tending to bite into the rim portions under the clamping engagement of the lip 14 between the jaws 17 and 19.

*Operation*

Operation of the structure will best be understood in referring to Fig. 5 wherein the structure is shown in the attached position in solid lines, and the original presentation of the device to the rim in dash lines. In mounting the lug on the tire 10, the arm 18 is rocked on the pivot pin 21 away from the lever 20, as from the solid line position to the dash line position. This spreads apart the jaws 17 and 19, to leave a gap therebetween from the line 35 of the jaw 17 and the nose of the jaw 19 sufficient to provide ample clearance to have the line 35 spaced well above the lip 14 when the jaw 19 is brought up thereunder and pushed in against the flange 13 which is the side wall of the rim 11. The juncture between the outturned lip 14 and this wall 13 is rounded as indicated, and the contour of the nose of the jaw 19 is made to be such that it will fit back against the curvature between the wall 13 and the lip 14 as is well indicated in the drawing. In this relative position of the arm 18 and the lever 20, the end 33 of the spring 31 will be bearing against the underside of the jaw 19 removed from the shoulder 30, thereby distorting the spring 31 but permitting the rocking outwardly of the arm 18.

With the jaw 19 thus located against the wall 13 and up under the lip 14, the arm 18 is rocked from the dash line position to the solid line position. In this rocking, the line 35 will move down to the line 35a which is well down and around the upper side of the lip 14 and just entered between the tire 10 and the upper end of the wall 13 from which zone the lip 14 curves. That is to say, the line 35a of the jaw 17 will be down below the uppermost side of the lip 14 substantially at the juncture of the curvature of the topside of the lip 14 with the straight innerside of the wall 13. In swinging arm 18 from the dash line position to the solid line position, the lever 20 will be rocked by its upper end into contact with the outer side wall of the tire 10, the two levers 20 being thereby presented compressibly against the side wall of the tire 10, one on each side of the arm 18. When the arm 18 reaches its position to carry the line 35 to the position 35a, with the jaw 19 in firm contact with the rim as just indicated, the arm 18 will have rocked relative to the two levers 20 to that position where the spring end 33 will drop in behind the shoulder 30 and thus retain the two jaws 17 and 19 in their rim clamping positions. The jaw 19 cannot move outwardly from the side wall 13 by reason of the jaw 17 coming in on the inner side thereof, and neither can the jaw 19 rise vertically by reason of its being held inwardly toward the wall 13 and under the lip 14. Any tendency to rise on the part of the jaw 19 is prevented by reason of the jaw 17 preventing upward and outward travel of the jaw 19.

While the arm 18 has thus been described as having rocked from its position in the dash lines to the position in the solid lines, the ring 26 will have been released from engagement with the notches 37 therealong and slipped to the uppermost end of the arm 18 to a position limited by the stop pins 27 and 28 to the position wherein the strap 25 may be rocked around over the end 18a of the arm 18 so that when the lug 15 is positioned over the tire 10, there will be sufficient permissible rocking of the arm 18 relative to the lever 20 to allow the arm 18 to rock outwardly into the dash line position so as to separate the jaw 18 from the jaw 19 the required distance to receive therebetween the lip 14. Where the device 16 is being attached to the inner side of the tire rim, that is the side farthest removed from the operator, the ring 26 may be dropped down along the arm 18 to some intermediate notch 37 and then the lug 15 pulled around over the tire and brought around to a position whereby the strap 25 will be in the dash line position preliminary to the attaching of the device 16 on the outer side of the tire as has been described above.

After the arm 18 has been rocked from the dash line position to the full line position the ring 26 may be pulled downwardly along the arm 18 to bring the inner side of the ring into the lowermost possible notch 37 to take up any slack in the lug as it extends around the tire. This should be a snug fit around the tire, but that fit is not critical in that an extra notch will not make any appreciable difference as to the engagement of the ring 26 therewith. It is the intention that the lug will be pulled around into snug engagement with the tire, but it is to be remembered that there will be the further engagement of the lug with the tire when the lug strikes the resistance in the mud as the wheel turns, tending to move the lug circumferentially of the tire, with such movement limited by the pull of the side members on the devices 16. This causes the lug to tend to bite into the tire since there is no stretch of any consequence in those side connections, with the result that the lug is actually fitted into a compressed groove across the tire tending to remove a considerable portion of the load from the side attachments to the devices 16 all as may be readily appreciated by those versed in the art.

While the lug 15 has heretofore been described as a section of a tire casing, this lug may take the form as shown in Fig. 4 wherein the lug may be one or more chains attached to the strap 25, such as by engaging ears 38 at the upper end thereof. Where two chains 39 and 40 are so used, they are preferably spread apart by any suitable means, herein shown as by a spreader bar 41 so that the chains will be spaced apart around the periphery of the tire to give additional separated lugs.

It is to be noted that the lug attaching strap 25 is on the outside of the arm 18 and spaced outwardly from the lever 20 which is normally rocked under the pull of the lug against the side of the tire 10. This arrangement of the parts causes the arm 18 and the lever 20 to be pulled in closely to the side of the tire 10, in such manner that it is not normally in the way where it would be damaged by a rock or something being present in the mud, where the obstruction would be rigid and not yielding. Not only is that true, but should the tire be so embedded in the mud, that the rim 11 is below the surface of the ground, these members 18 and 20 serve as additional side lugs over and above the lugs extending across the tread of the tire. As above indicated, the circumferential lengths of the lugs 15 or chains 39 and 40 as the case may be are such that, where dual tires are employed as on large size trucks, one device 16 may be placed on the farthest side of the innermost rim, and the lugs brought across both tires without going therebetween, and secured to the outermost side of the outermost rim. In this manner, the lugs will have not only the "biting" extension from the tires directly over the tires, but also will carry across the space between the tires affording increased surface in an effective manner. The spacing apart of the jaws determined by the screw 24 provides for proper fitting of the jaws 17 and 19 on rims of varying metal thickness which is in any event slight.

While we have herein shown and described our invention in the particular forms as illustrated, it is obvious that structural changes may be employed without departing from the spirit of the invention, and we therefore do not desire to be limited to that precise form beyond the limitations which may be imposed by the following claims.

We claim:

1. The combination with a tire mounted on a rim having side walls and lips extending annularly therearound and turned laterally outwardly through a radius from said walls: of a pair of tire lug carrying structures, one on each side of said rim, each engaging over and held by said lip, comprising a jaw extending under said lip; a lever carrying said jaw; a second jaw extending over said lip; an arm carrying said second jaw; said arm being rockably carried by said lever swinging said jaws toward and away from each other; said first jaw having a nose bearing against the under side of said lip approximately in the zone of the curvature of said radius; said second jaw being curved from said arm and terminating in approximately a line edge, passing over said lip and downwardly to said wall in lateral opposition to said first jaw nose; a lug over said tire; lug carrying members extending one each toward one of said arms; and means interengaging said members with said arms.

2. The combination with a tire, a rim on which the tire is carried, a wall on each side of the rim, and a lip flaring laterally from the wall: a lug extending around the tire and radially of the tire side walls, and a lug carrying structure comprising a pair of tongs having hinged legs and a laterally turned jaw on each leg gripping said lip in each instance between the jaws, one of said legs being initially rocked against the tire side wall; said lug engaging the other of said legs tending to rock it toward said tire side wall.

3. The structure of claim 2 in which there is means releasably retaining said legs in jaw gripping positions.

4. The structure of claim 2 in which said means includes connections with said lug selectively locating said means at different positions along said other legs.

5. The structure of claim 2 in which one of said jaws is curved and hooks over and extends below the top side of said lip interiorly of said rim, and said other jaw extends under said lip, the curvature of said one jaw tending to urge said other jaw toward said rim wall.

6. The structure of claim 5 in which said other jaw is carried by said one leg, and said one jaw is carried by said other leg.

7. The combination with a tire and a rim mounted thereon, and a lip flaring outwardly from outer sides of the rim: of a tire lug; and a lug to lip engaging means on each side of said tire comprising an arm; a jaw curving arcuately from the arm; a pair of levers, one on each side of the arm; means rockably interengaging said arm and levers on a common axis; a rounded nose jaw extending laterally from each of said levers under said lip; said arcuate jaw being rockable by travel of said arm over and inside of said lip to position its outermost portion in opposition to said lever jaws; said two levers being free and normally bearing against said tire; said arm being in a position along the side of the tire when said lip is clamped between said jaws; and means interengaging said lug with said arm, one on each side of the tire, retaining said arms in said positions.

8. The structure of claim 7 in which said lug interengaging means comprises a plurality of abutments along at least one of said arms, and a member carried by said lug selectively positioned at one of said abutments retaining said lug tautly across the tire.

9. The structure of claim 7 in which said lug interengaging means comprises a plurality of abutments along the side of said arm toward the tire, a strap extends from said lug over the opposite side of the arm, and a ring is carried by the strap and loosely receives said arm therethrough, and is rockable to pass certain of said abutments and engage behind a selected abutment.

10. The structure of claim 7 in which there is means releasably resisting rocking of said arm in relation to said levers when in their lip clamping positions.

References Cited in the file of this patent

UNITED STATES PATENTS

| | | |
|---|---|---|
| 2,204,886 | Devlin | June 18, 1940 |
| 2,457,208 | Carpenter | Dec. 28, 1948 |
| 2,675,845 | Donaldson | Apr. 20, 1954 |